July 15, 1930.   W. W. VOSPER   1,770,499
VISE MOUNTING STRUCTURE
Filed Sept. 28, 1925
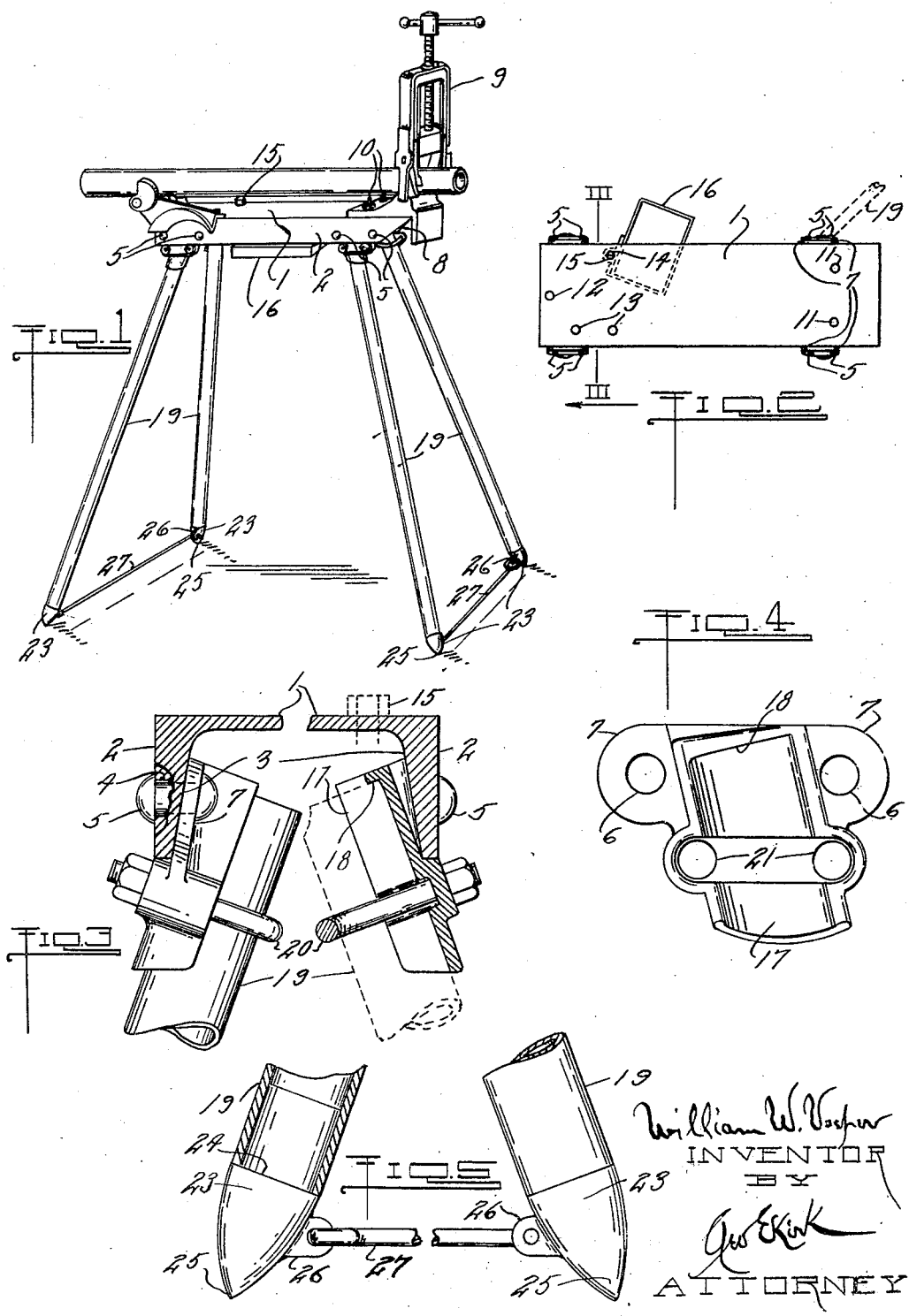

Patented July 15, 1930

1,770,499

UNITED STATES PATENT OFFICE

WILLIAM W. VOSPER, OF TOLEDO, OHIO, ASSIGNOR TO THE TOLEDO PIPE THREADING MACHINE COMPANY, OF TOLEDO, OHIO, A CORPORATION OF OHIO

VISE-MOUNTING STRUCTURE

Application filed September 28, 1925. Serial No. 59,055.

This invention relates to spread leg tables.

This invention has utility when incorporated in knockdown metal tables or of the vise bench type.

Referring to the drawings:

Fig. 1 is a perspective view of a set up of the table with its tray as a vise bench as for holding pipe to be threaded;

Fig. 2 is a plan view of the table dismantled;

Fig. 3 is a section on the line III—III, Fig. 2, showing the tray mounting to the table, as well as the leg bracket assembly with the table platform;

Fig. 4 is a detail view looking into the leg side of a bracket; and

Fig. 5 is a detail view of a leg foot or lower end closure and its mounting.

In the embodiment of this invention, a desired length of structural metal, as a channel, may be taken having web portion 1 upward to form table platform. Pair of flanges 2 have their diverging downwardly extending opposing faces 3 with openings 4 therein for rivets 5 as through the openings 6 in ears 7 to this bench or table top. The ends of the channel are cut back at 8 for clearance in mounting various types of vises 9 which may be assembled by bolts 10 through openings 11 in the table top or web 1 of the bench. Additional bolt openings 12, 13, may be provided for mounting other accessories as pipe bender. Opening 14 is shown as having bolt 15 therein as a mounting bracket pin for tray 16 swingable thereon into position under the bench 1. There is thus provided a convenient receptacle for minor tools, as wrenches, substitute dies, guides, etc. This table is one which is adapted for ready set up in desired positions on the job. It is readily portable and yet it is rigid when set up.

The ears 7 of the bracket, as spaced, have therebetween, a concave seat portion 17 terminating adjacent the ears 7 in ledge 18 perpendicular to the axis of the seat portion 17. This axis of the seat 17 in the form of support as herein shown is approximately 15° addition to the 10° lines of the faces 3 of the flanges 2 of the channel. This makes the total outward spread to be given legs 19 by these brackets of 25° away from the outer plane of the flanges 2 of the channel. The seats 17 are shown to be in the direction of the spread for the legs. Leg 19 is positioned in the seat 17 to abut the ledge 18, and is held in position by U-bolt 20 with the legs of such U-bolt protruding through pair of openings 21 intermediate the extent of the seat 17. As so protruding through these openings 21, the legs of the U-bolt may be detachably engaged thereby serving as a knock-down mounting for assembling the legs with the bench portion deck 1 of the table.

These cylindrical legs 19 are preferably tubular and in the lower terminal portions thereof have plug closures 23 driven thereinto up to shoulders 24 with taper or point terminus 25 as the foot proper. This pipe closure terminus is herein shown of cast material with integral cast eye 26 in which may be assembled link 27 between the pair of these feet of this bench or table. There is, accordingly, provided a strut resisting spreading of the legs, thereby contributing to the strength and stability of this table structure.

The wrought or structural shape for the table proper, as well as the pipe type of legs may each be selected for any desired length so that the table height and table length may be one of convenient adaptation. There is lightness and great strength in this structure, as well as the convenience for transportation due to its ready knock-down compact assembly features.

What is claimed and it is desired to secure by United States Letters Patent is:

1. A structural shape having a horizontally extending web, a pair of depending flanges diverging from the web, there being downwardly extending members fixed to the diverging flange sides providing leg seats, there being openings through the members spaced from the flanges, legs longitudinally movable into the seats, and U-bolts spaced from the flanges and extending through said openings for detachably anchoring said legs in said seats.

2. An integral mounting bracket for a leg, said bracket having a pair of mounting ears and a concave seat for a leg, said seat terminating in a ledge perpendicular to the axis of the leg, there being a pair of parallel openings through the bracket spaced from said ledge and being located one on each side of said seat, and leg engaging means coacting with the openings to form a mounting unit for said leg.

3. A structure having a pair of tubular legs extending therefrom to have free ends, tips insertable in the free ends of said legs to protrude terminally therefrom, each of said tips having an eye, and a rigid one-piece tie rod connecting said eyes for effecting fixed spacing of the legs against inward and outward shifting.

4. A channel having a horizontal web, a pair of downwardly extending flanges on two sides of said web, leg sockets with beveled flange contacting portions fixed to the inside of said flanges, legs for said sockets, the beveled portion of said sockets producing a divergence of the legs, said legs longitudinally movable into said sockets, and leg anchoring means spaced from the web and flanges and extending through the sockets and around three sides of the legs.

5. A channel having a horizontal web, a pair of downwardly extending flanges on two sides of said web, leg sockets with beveled flanges contacting portions fixed to the inside of said flanges, legs for said sockets, the beveled portion of said sockets producing a divergence of the legs, said legs longitudinally movable into said sockets, leg anchoring means spaced from the web and flanges and extending through the sockets and around three sides of the legs, tip closures for the lower ends of the legs having integral eyes, and a tie rod directly between the eyes of a pair of tip closures.

In witness whereof I affix my signature.

WILLIAM W. VOSPER.